(No Model.)
M. A. GERBER & E. J. NICHOLAS.
WHIFFLETREE.
No. 344,574. Patented June 29, 1886.
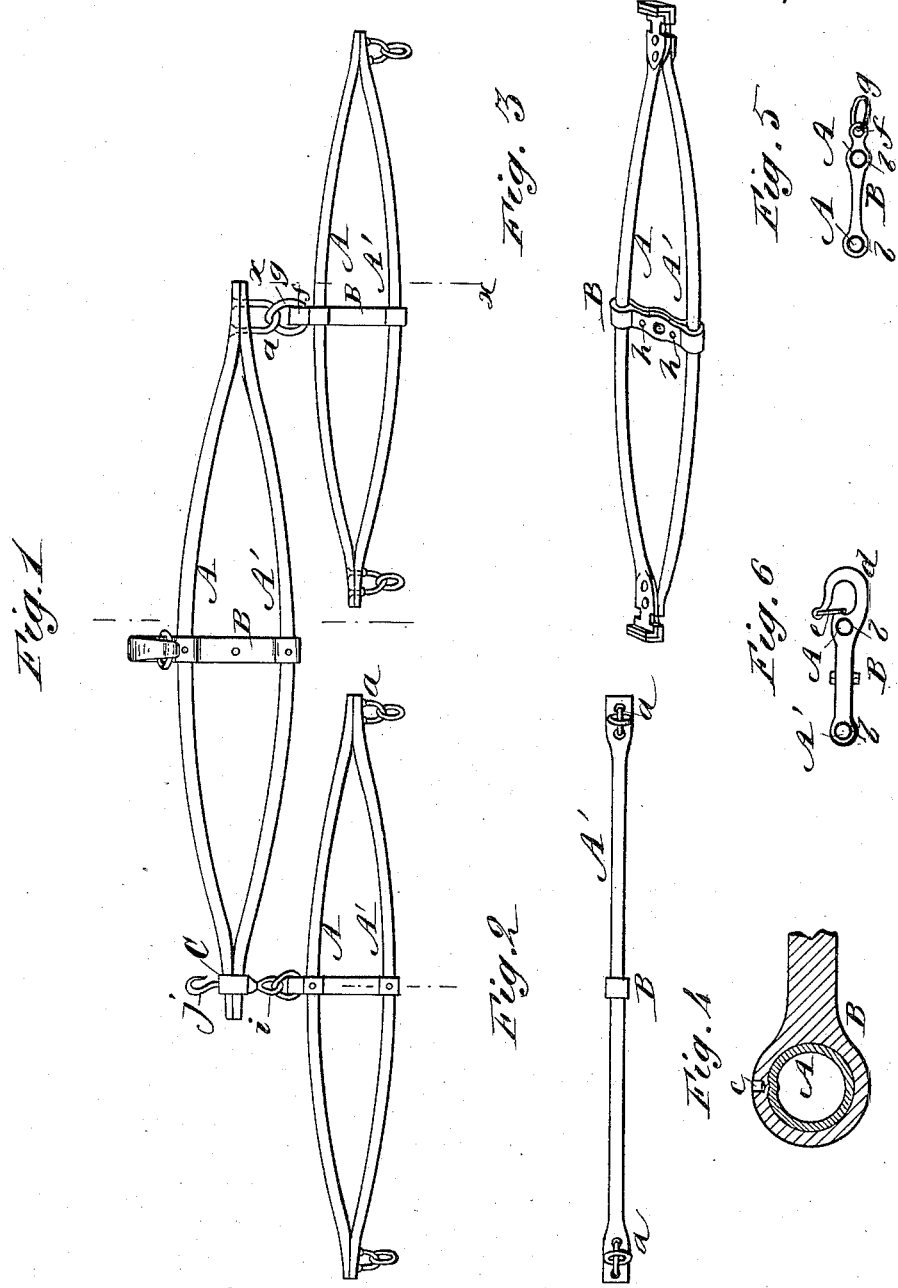
WITNESSES:
C. Neveux
C. Sedgwick
INVENTOR:
E. J. Nicholas
M. A. Gerber
BY Munn & Co
ATTORNEYS.

UNITED STATES PATENT OFFICE.

MAHLON A. GERBER AND EDWARD J. NICHOLAS, OF LOST CREEK, PA.

WHIFFLETREE.

SPECIFICATION forming part of Letters Patent No. 344,574, dated June 29, 1886.

Application filed January 13, 1886. Serial No. 188,484. (No model.)

*To all whom it may concern:*

Be it known that we, MAHLON A. GERBER and EDWARD J. NICHOLAS, of Lost Creek, in the county of Schuylkill and State of Pennsylvania, have invented a new and useful Improvement in Whiffletrees, of which the following is a specification, reference being had to the annexed drawings, forming a part thereof, in which—

Figure 1 is a plan view. Fig. 2 is a side elevation. Fig. 3 is a perspective view. Fig. 4 is a detail view showing the cross-bar fastening. Fig. 5 is a transverse section taken on line $x\ x$ in Fig. 1. Fig. 6 is a detail view of the combined cross-bar and whiffletree-hook.

Similar letters of reference indicate corresponding parts in the different figures of the drawings.

The object of our invention is to provide a light, strong, and easily-made whiffletree.

Our invention consists in the construction and arrangement of parts, as will be hereinafter fully described, and specifically pointed out in the claims.

The pipes A A', of which the body of the whiffletree is formed, are flattened at their ends and secured together by rivets passing through the flattened portions, as shown in Fig. 3, or by the staples $a$, or by eyebolts which are riveted in the flattened ends of the whiffletree. The pipes A A' are bent outward away from each other, and a cross-bar, B, having transverse holes $b$, is received on the pipes A A' and secured thereon by punching the material of the cross-bar down into the material of the pipe, as shown at $c$ in Fig. 4, or by riveting.

The rear end of the cross-bar B is provided with a hook, $d$, having the latch $e$, which closes the open end thereof, as shown in Fig. 6, or is provided with an eye, $f$, for receiving the ring $g$, as shown in Figs. 1 and 5.

When it is desired to secure the traces directly to the whiffletree, the flattened ends of the pipes A A' may be turned upward, as shown in Fig. 3, and notched in opposite sides to receive the traces, or to receive the ring or hook connected with the traces, and the cross-bar B, instead of being provided with the eye $f$ or whiffletree-hook $d$, may be apertured transversely, as shown in Fig. 3, to receive the whiffletree-bolt.

When the cross-bar B is made entire of a single piece of iron, the pipes A A' are inserted in the apertures thereof before the ends are flattened; but if it is desirable to apply the cross-bar to the whiffletree after the ends have been flattened and secured together by rivets or by riveting the staples therein, as described, the cross-bar may be made in halves and secured together by means of rivets or bolts $h$, as indicated in Fig. 3.

By making the whiffletree of two pieces of pipe bent outwardly and secured in the cross-bar, as shown, we are enabled to secure great rigidity with little weight of material.

It is obvious that instead of employing pipes for the parts of our improved whiffletree we may employ solid rods of iron or steel.

The double-tree or evener is made in substantially the same form as the whiffletree, but of heavier material, and the ends of the pipes A A' are bound together by the clamp C, which embraces the ends of the pipes, as shown in Fig. 1, one side of the clamp being provided with an eye, $i$, for receiving the single-tree, the opposite side of the clamp being provided with a hook, $j$, for receiving the tail-chain.

Having thus described our invention, what we claim as new, and desire to secure by Letters Patent, is—

1. A whiffletree formed of pipes A A', flattened at their ends, secured together, and having attaching devices on said flattened ends, the pipes being bent outward between their ends, the cross-bar B, having end apertures within which the central parts of the pipes are secured by the indentations $c$, substantially as shown and described.

2. In a whiffletree, the combination, with the bar B, having transverse apertures $b$, and provided with a hook, $d$, and latch $e$, of the pipes A A', imperforate at their centers, received in the apertures $b$ of the cross-bar, the pipes being flattened at their ends and secured together by staples $a$, riveted therein, substantially as shown and described.

MAHLON A. GERBER.
EDWARD J. NICHOLAS.

Witnesses:
JOHN F. REYNOLDS,
ALFRED BURCHILL.